US012496616B2

(12) United States Patent
Jensen

(10) Patent No.: US 12,496,616 B2
(45) Date of Patent: Dec. 16, 2025

(54) AUTOMATED PARTICLE SEPARATION EXTRACTED FROM SOIL INCLUDING REGOLITH ASSOCIATED WITH ANY GEOLOGIC ENVIRONMENT

(71) Applicant: ICON Technology, Inc., Austin, TX (US)

(72) Inventor: Evan Jensen, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 0 days.

(21) Appl. No.: 18/243,098

(22) Filed: Sep. 6, 2023

(65) Prior Publication Data

US 2025/0073755 A1 Mar. 6, 2025

(51) Int. Cl.
*B07B 13/04* (2006.01)

(52) U.S. Cl.
CPC .................................... *B07B 13/04* (2013.01)

(58) Field of Classification Search
CPC ......... B07B 13/04; B07B 13/05; B07B 13/10; B07B 13/113; B07B 13/116
See application file for complete search history.

(56) References Cited

U.S. PATENT DOCUMENTS

| | | | | |
|---|---|---|---|---|
| 9,133,592 B2 * | 9/2015 | Becattini, Jr. | ......... | E01H 1/1206 |
| 10,660,300 B2 * | 5/2020 | Davids | ................. | A01K 1/0114 |
| 2013/0037460 A1 * | 2/2013 | Thomas | ................ | B07B 13/113 209/479 |
| 2018/0169703 A1 * | 6/2018 | Clahassey | ............. | E01H 12/002 |

* cited by examiner

*Primary Examiner* — Michael Mccullough
*Assistant Examiner* — Jessica L Burkman
(74) *Attorney, Agent, or Firm* — KOKKA & BACKUS, PC

(57) ABSTRACT

Various embodiments relate generally to soil and particulate science and data analysis thereof, computer software and systems, and control systems and algorithms based on characteristics of subsets of particulate graph-based data arrangements, among other things, and, more specifically, to a computing and a mechanical platform configured to identify and classify particles in, for example, any regolith from any planetary soil environment, and further dispense with classified particles in accordance with a classification, such as forming a base materials for any planetary construction.

16 Claims, 10 Drawing Sheets

AUTOMATED PARTICLE SEPARATION EXTRACTED FROM SOIL INCLUDING REGOLITH ASSOCIATED WITH ANY GEOLOGIC ENVIRONMENT

GOVERNMENT LICENSE RIGHTS

This invention was made with government support under contract number 80NSSC22CA196 awarded by the National Aeronautics and Space Administration ("NASA"). The government has certain rights in the invention.

FIELD

Various embodiments relate generally to soil and particulate science and data analysis thereof, computer software and systems, and control systems and algorithms based on characteristics of subsets of particulate graph-based data arrangements, among other things, and, more specifically, to a computing and a mechanical platform configured to identify and classify particles in, for example, any regolith from any planetary soil environment, and further dispense with classified particles in accordance with a classification, such as forming a base materials for any planetary construction.

BACKGROUND

Advances in robotics, computing hardware, and software ignited various improvements in forming materials for construction, including extraction and analysis of materials from which an entity may be constructed.

In some cases, known sorting mechanisms for regolith or particulate size(s) implement sieve shakers and other typical filtering mechanisms. Known mechanisms and processes for separating and filtering soil, including regolith (including lunar regolith or any other planetary regolith), dry concrete, or any other material, including water in a solid form, are not well-suited to sort particles, for example, by size. Often sieve mechanisms are implemented to shake particles loose, however in longer term usage, or with materials with certain particle shapes, the screens can become clogged, leading to failure or increased maintenance intervals. Usual sieve mechanisms typically require manual intervention to resolve issues, which a hinderance in autonomous implementations on any planet, asteroid, or extraterrestrial body.

Thus, what is needed is a solution to identify, separate, sort, and implement particles, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in any arbitrary order, unless otherwise provided in the claims.

A detailed description of one or more examples is provided below along with accompanying figures. The detailed description is provided in connection with examples, but is not limited to any particular example. The scope is limited only by the claims, and numerous alternatives, modifications, and equivalents thereof. Numerous specific details are set forth in the following description to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

Figure 1:
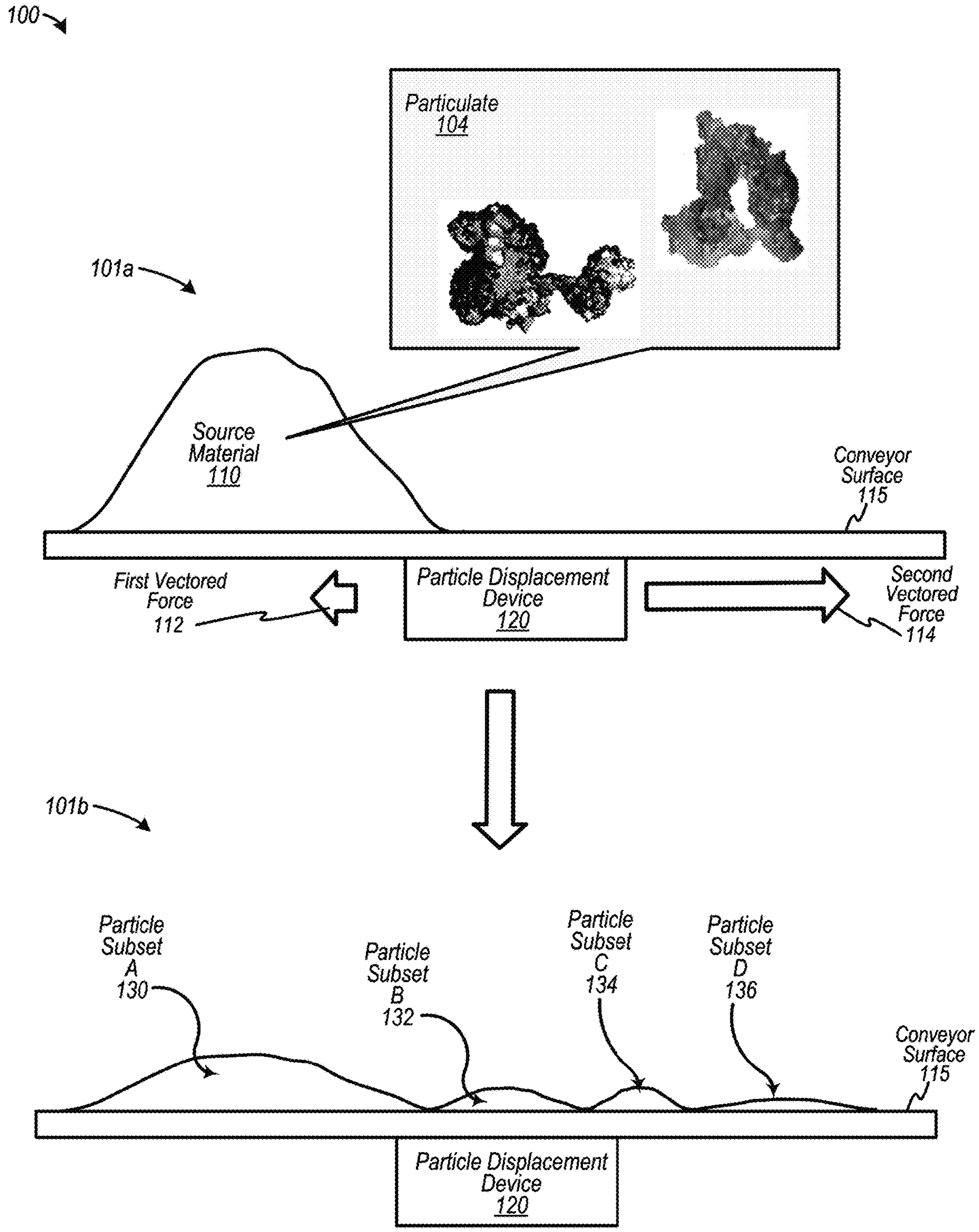
FIG. 1 is a diagram depicting a particle separation device, according to some embodiments.

FIG. 1 is a diagram depicting a particle separation device, according to some embodiments. Diagram 100 depicts an example of a particle separation device configured to transmogrify or sort a source material, such as source material 110 into subsets of the source material 110. Diagram 100 depicts an example of a particle displacement device 120 coupled to a conveyor surface 115 upon which source material 110 of 101*a* may be received. As depicted, source material 110 may include any type of material, soil, or geologic item, including regolith associated with any celestial body, such as a moon, an asteroid, or a planet, such as the planet Mars. In this example, source material 110 is depicted to include particulate 104, any of which may have various sizes and shapes (e.g., un-weathered by external conditions). Particulate 104 may be formed in shapes that may present challenges to separate through known sieve and screen techniques. Particulate 104 may be formed by bombardments of meteoroids, solar ultra-violet flux, solar winds, radiation, etc. In at least some cases, particulate 104 may include agglutinates formed to include various fused particles, such as glass, rock, minerals, and any other solid. Also, particulate 104 may include any variety of minerals, including rock fragments, glass particles, etc.

Particle displacement device 120 may be configured to displace or separate particles in accordance with surface features, size, mass, density, and any other characteristic. In at least one example, particle displacement device 120 may be configured to apply a first vectored force 112 with which to transition source material 110 to preserve surface tension, cohesiveness, or static friction. Yet, particle displacement device 120 also may be configured to apply a second vectored force 114 with which to transition source material 110 to overcome or break the surface tension, cohesiveness, or static friction of particulate 104.

In some examples, particle displacement device 120 may be configured to implement "stick-slip conveyance." Using this method, particles 104 or in many cases, discrete items may be transitioned up an incline or across a plane, such as convey surface 115, with a particular vibrational frequency. So, particles 104 "stick" and are moved along with conveyor substrate material 110 without breaking static friction. On a following cycle, conveyor substrate material 110 is moved with more velocity and acceleration to disrupt static friction to cause separation of particulate 104. This causes the "slip," which may be a failure of the material to maintain static friction with other particles of source material 110.

Particle displacement device 120 may cycle continually to implement a "stick-slip" process to filter or separate particulate 104. Diagram **101*b* depicts an example in which source material 110 may be filtered or separated as particles into particle subset A 130, subset B 132, subset C 134, subset D 136**.

Figure 2:
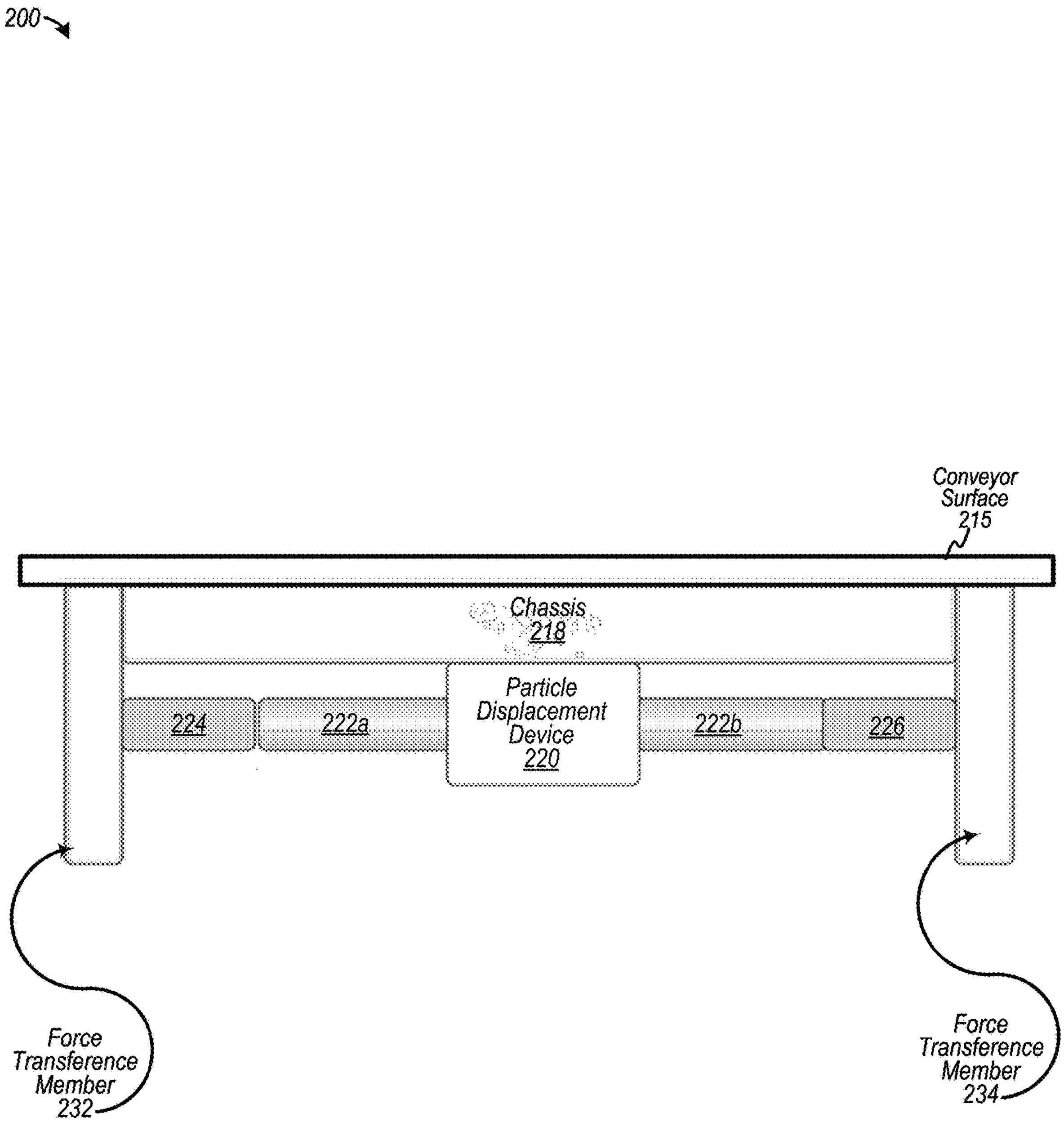
FIG. 2 depicts an example of a particle separation device, according to some examples.

FIG. 2 depicts an example of a particle separation device, according to some examples. Diagram 200 shows a particle displacement device 220 configured to filter or separate particles disposed upon conveyor surface 215. As shown, particle displacement device 220 may include a transitive member shown as portions **222*a* and 222*b*, each portion configured to provide dynamic forces of various velocities and acceleration to conveyor surface 215. Particle displacement device 220 may be configured to engage resilient or elastic devices 224 and 226. In various examples, devices 224 and 226 may be implemented as "springs," any of which may have a value of compressibility or resilience configured for particular implementations, however devices 224 and 226** may be automatically "tunable" with configurable functionality as a spring.

In operation, particle displacement device 220 may be configured to cause portions **222*a* and 222*b* to apply a force to corresponding devices 224 and 226 to impart a force to either force transference members 232 or 234. A force may be transferred to conveyor surface 215 disposed upon, for example, a chassis 218. And at least one embodiment, particle displacement device 220 may be implemented as an electromotive device, such as a direct current ("DC") motor. In various examples particle displacement device 220** may be configured to implement hydraulic motion and force, as well as gas propelled motion and force (e.g., compressed air or any other gas).

Figure 3A:
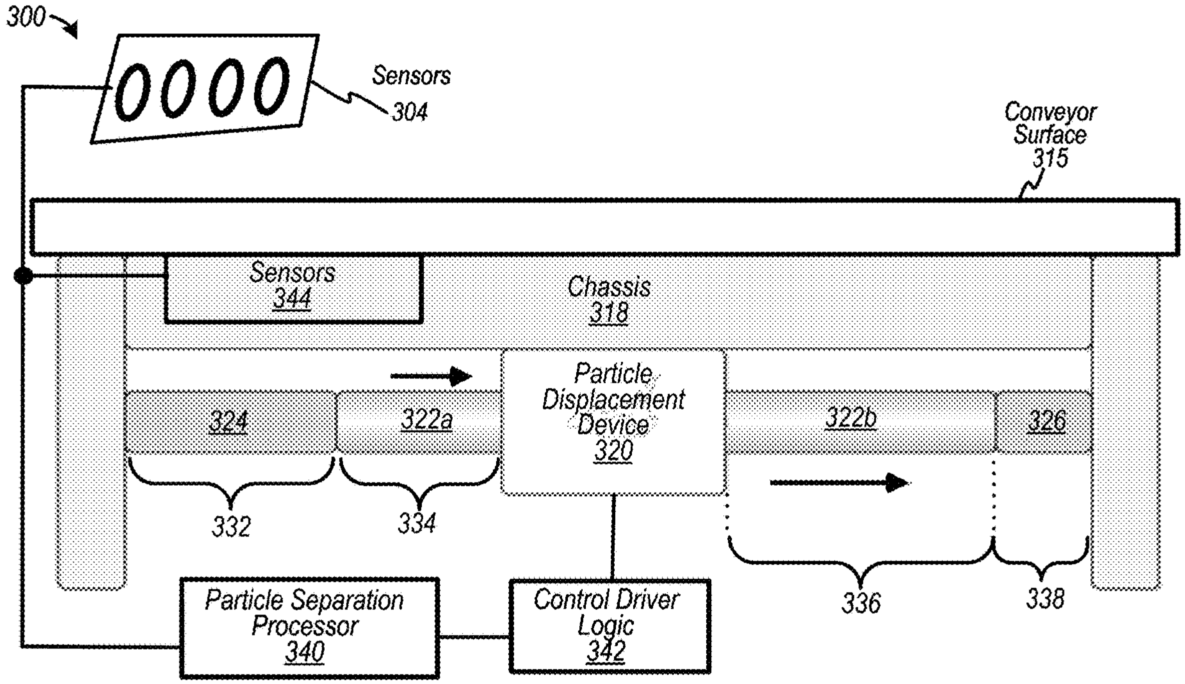
FIGS. 3A and 3B depict operation of a particle displacement device in different cycles, according to various examples.
Figure 3B:
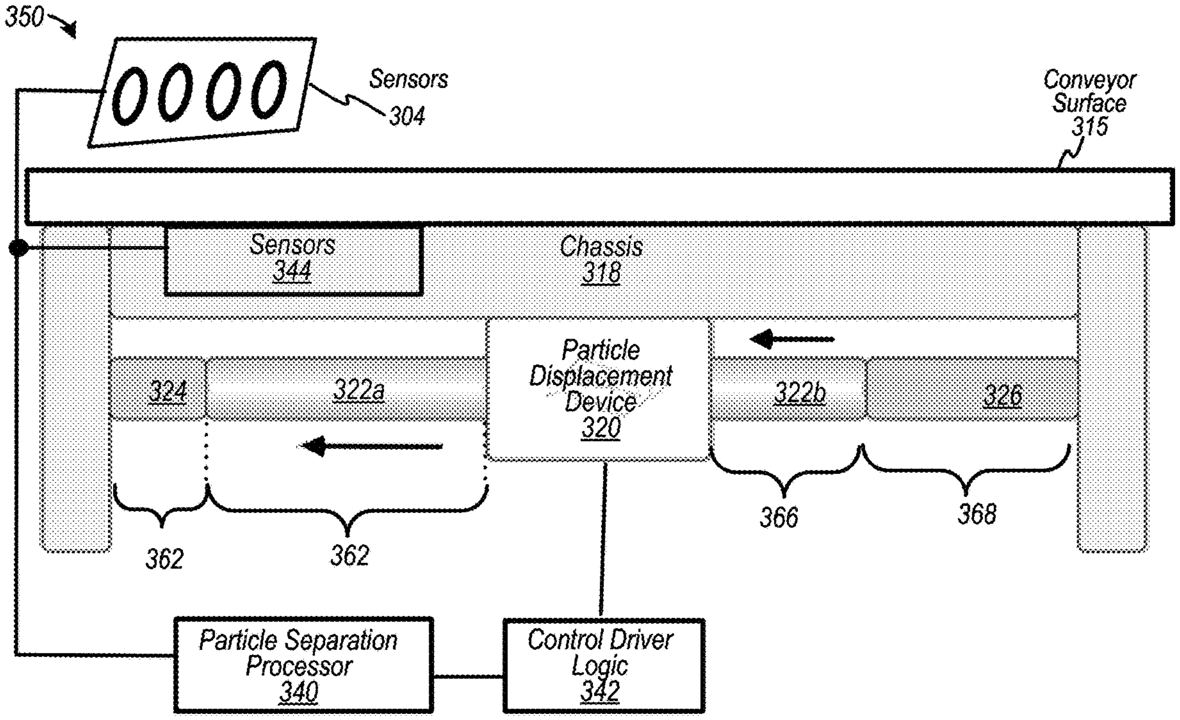

FIGS. 3A and 3B depict operation of a particle displacement device in different cycles, according to various examples. FIGS. 3A and 3B a particle displacement device 320 may be configured to operate in at least two cycles to separate any source material disposed upon conveyor surface 315. In some examples, any number of sensors 304 and 344 may be implemented to classify types of particles disposed upon conveyor surface 315 (e.g., classification by mass, structure, shape, etc., or any other predictive characterization). In FIGS. 3A and 3B, a particle separation processor 340 may be coupled to any number of sensors 304 and 344 to determine characteristics of particulate or any particles for separation. Sensors 304 and 344 may include any number of sensors, including sensors to determine weight or mass (e.g., compensating for gravity and other environmental conditions), visual appearance or structure with which to predict a size and mass (e.g., based on machine learning), among other things, etc.

Figure 4A:
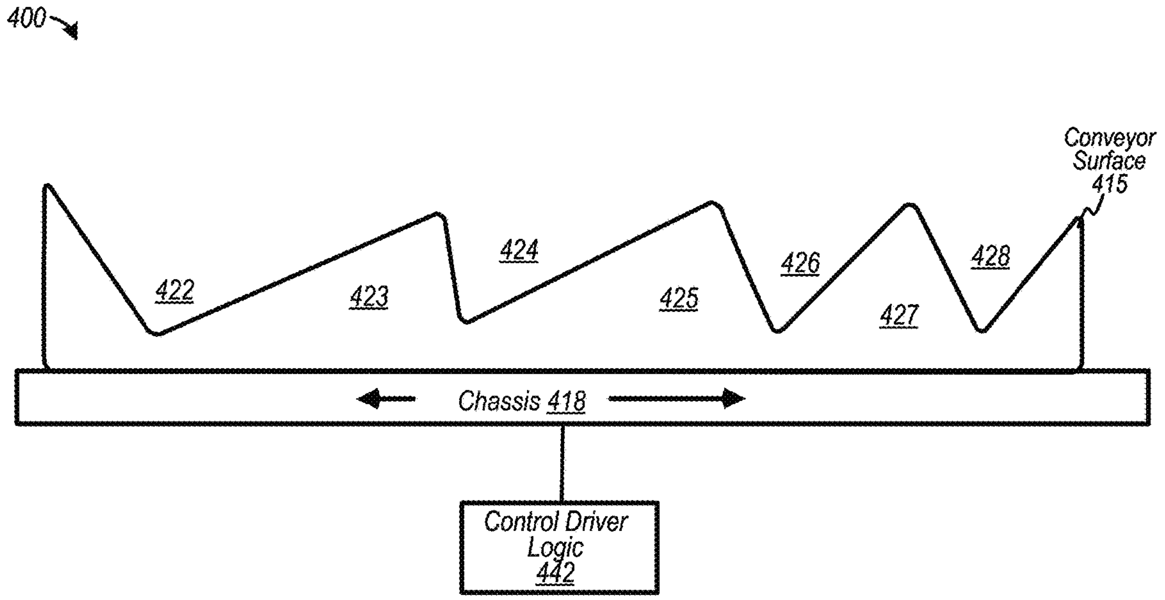
FIGS. 4A, 4B, and 4C depict operation of one or more particle separation devices operational with a particle displacement device, according to various examples.
Figure 4B:
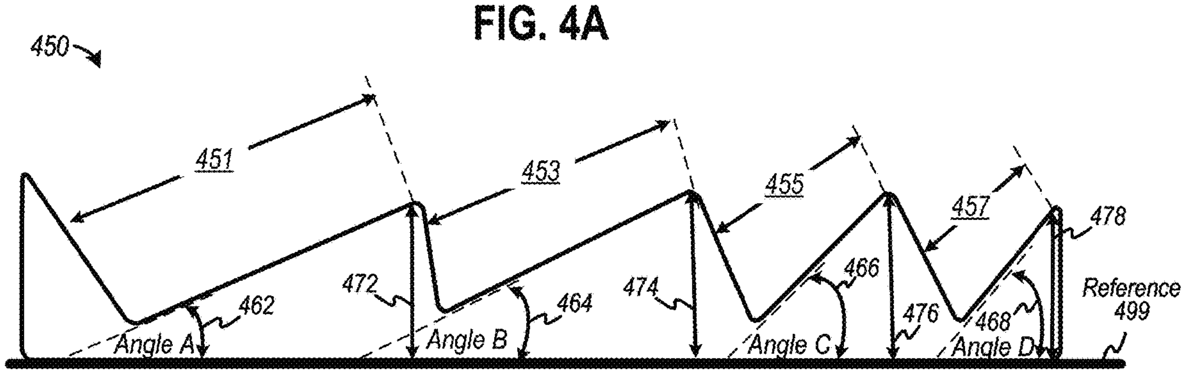
Figure 4C:
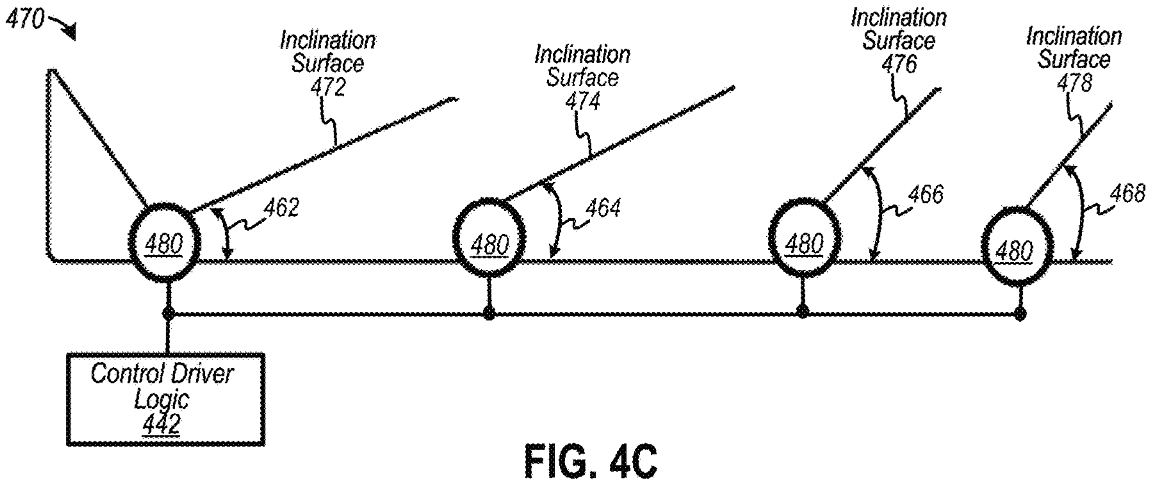

In diagram 300 of FIG. 3A, particle displacement device 320 may be configured to impel a portion **322*b* over a distance 336 to impinge upon spring 326 to reduce (e.g., compress) its structure as distance 338, under control of control driver logic 342. Control driver logic 342 may be configured to receive sensor data from sensors 304 and 344 to determine an application of a force upon conveyor surface 315 to separate one or more subsets of particles. As shown in FIG. 3A, elastic device 324 (e.g., as a spring) may be configured to elongate at a distance 332 as portion 322*a* of a transitive member may change its distance 334 as it translates force in a direction. Equivalently, particle displacement device 320 depicted in FIG. 3B shows, as an example, may depict implementation for another cycle in which elastic device 324 (e.g., as a spring) may be configured to compress at a distance 382 as portion 322*a* of a transitive member may change its distance 362 as it translates force in a direction, FIGS. 4A, 4B, and 4C depict operation of one or more particle separation devices operational with a particle displacement device, according to various examples. Diagram 400 of FIG. 4A is an example of a particle separation device with which to filter or separate particles. As shown in FIG. 4A, diagram 400 depicts a conveyor surface 415 disposed on chassis 418, which may be configured to urge particles, responsive to vibratory forces, into groupings or bins 422, 424, 426, and 428 to classify particles based on size or other characteristics. Structures 423, 425, and 427, among others, can be configured to provide angles of incline configured to separate particles. Control driver logic 442** may be configured to effectuate application of forces to urge particles over the inclinations based on, for example, particle size.

FIG. 4B includes diagram 450 to illustrate an example of a configuration of a conveyance surface to filter or separate particles in accordance with some examples. Diagram 450 depicts various levels of inclination, as described by lengths 451, 453, 455, 457, whereby each inclination may be associated with a corresponding angle 462, 464, 466, and 468. Also shown, an inclination may be described in terms of height 472, 474, 476, and 478, which may be relative to a reference 499.

FIG. 4C is a diagram 470 depicting configurable inclination surfaces to filter or separate particles, at least in one embodiment. As shown, control driver logic 442 may be configured to activate one or more translations devices 480 (e.g., an electric motor, etc.) to orientate inclination surfaces 472, 474, 476, and 478 at angles 462, 464, 466, and 468 to optimize binning, separation, or classification of particles. For example, sensors 304 and 344 of FIGS. 3A and 4B may be configured to provide feedback to control driver logic 442 of FIG. 4C to modify any of angles 462, 464, 466, and 468 responsive to a "stick-slip" application of forces. Further to FIGS. 4A to 4C, regarding disparate particle sizes, irrespective of other factors (e.g., smaller particles may require less energy to transit along an inclined surface for classifying particles).

Figure 5:
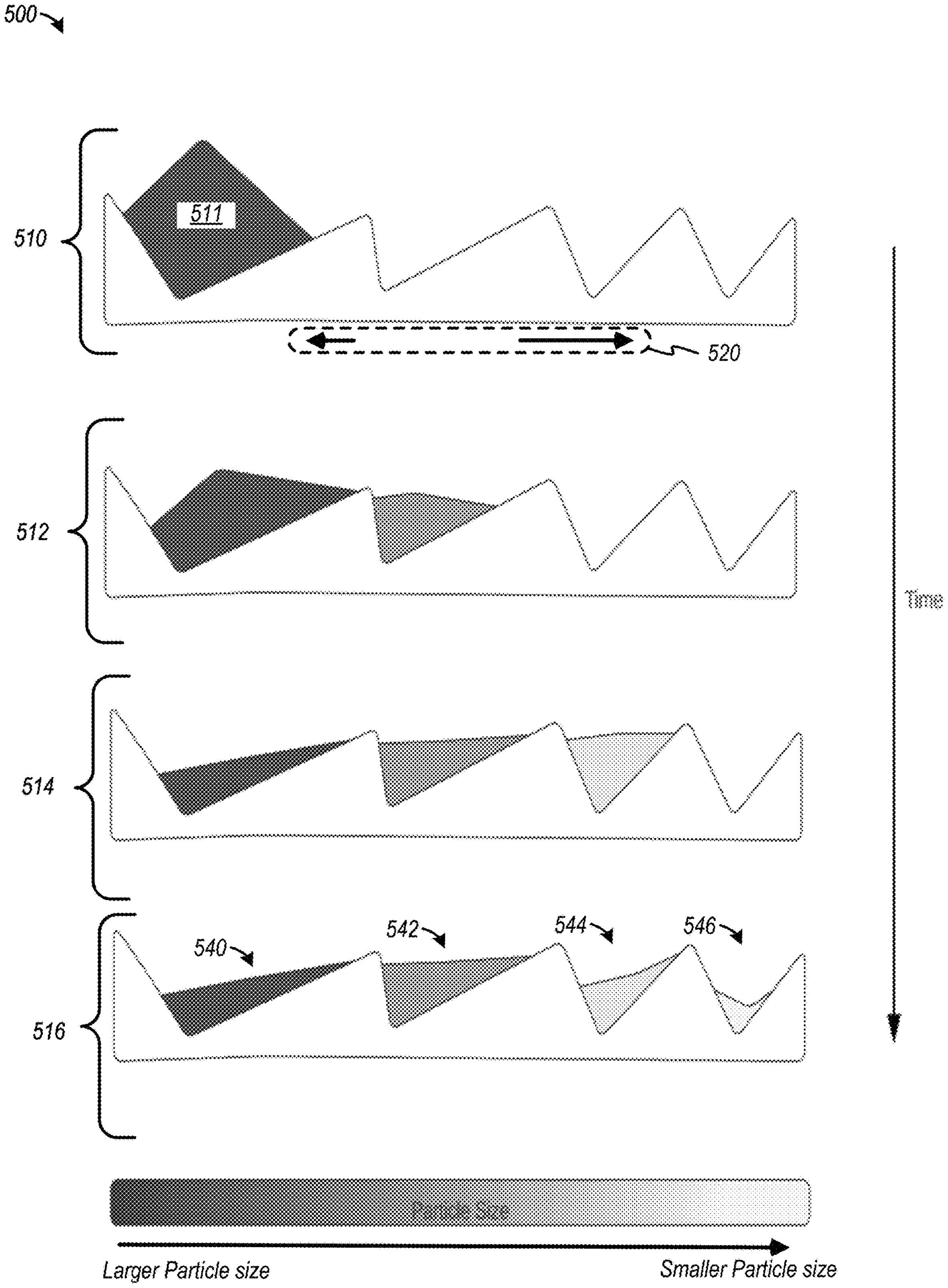
FIG. 5 depicts an example of binning, separation, or classification of particles, at least in one embodiment.

FIG. 5 depicts an example of binning, separation, or classification of particles, at least in one embodiment. Diagram 500 depicts various stages 510, 512, 514 and 516 of filtering a source material 511 implementing various applications of forces 520, which may include any number of subsets of vibratory forces in amplitude and/or duration. Diagram 500 depicts migration or transition of source material 511 into various bins or groupings 540, 542, 544, and 546 over time. In some cases, particulate at 546 may be of a desired size or quality with which to implement as a construction material, such as on a lunar surface.

Figure 6A:
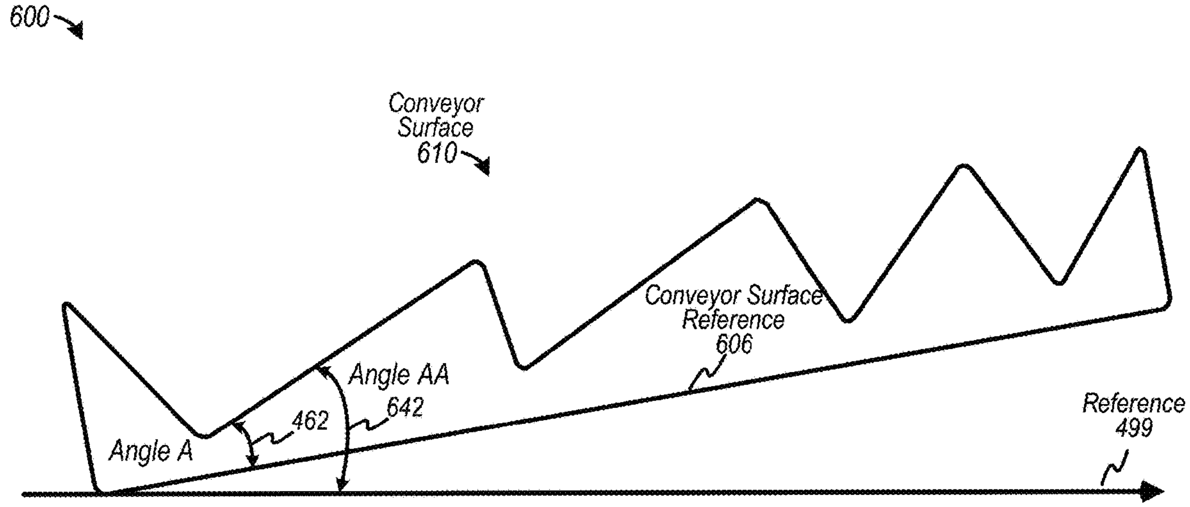
FIGS. 6A and 6B depict examples of varying orientations of particle separation devices to modify particle separation, according to an examples.
Figure 6B:
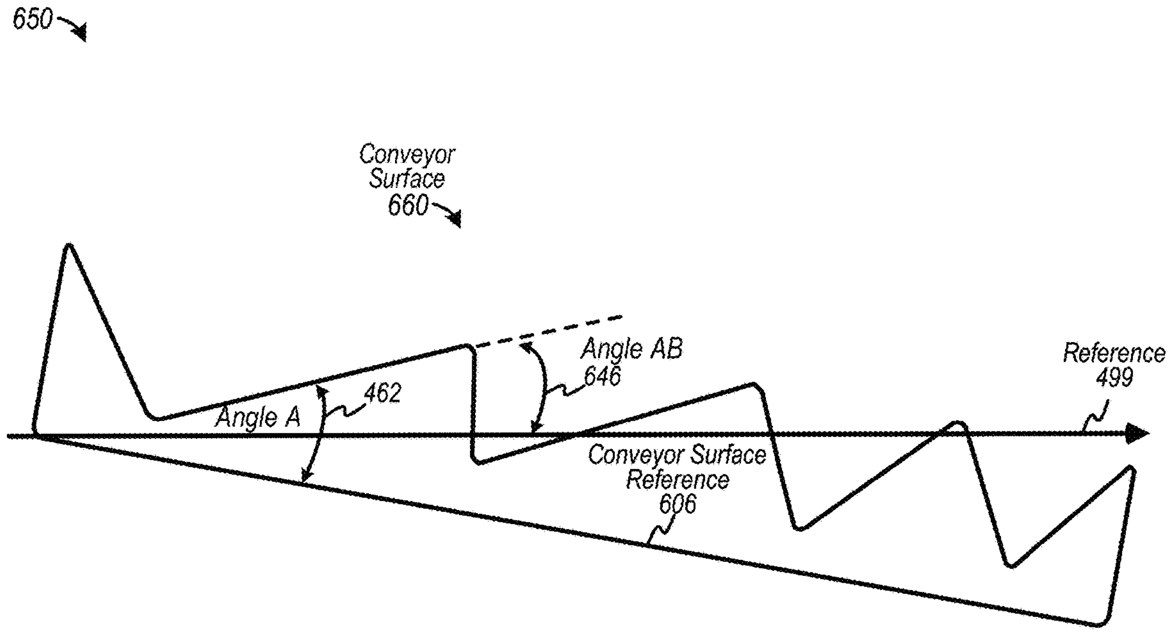

FIGS. 6A and 6B depict examples of varying orientations of particle separation devices to modify particle separation, according to an example. FIG. 6A includes a diagram 600 depicting a conveyor surface 610 oriented at a conveyor surface reference 606 relative to a reference 499. In this figure, angle ("A") 462 may be amplified to orient at a different angle ("AA") 642 of inclination. FIG. 6B includes a diagram 650 depicting a conveyor surface 660 oriented at a conveyor surface reference 606 relative to a reference 499. In this figure, angle ("A") 462 may be declined to orient angle 462 of an inclination plane at a different angle ("AB") 646 of declination.

Figure 7:
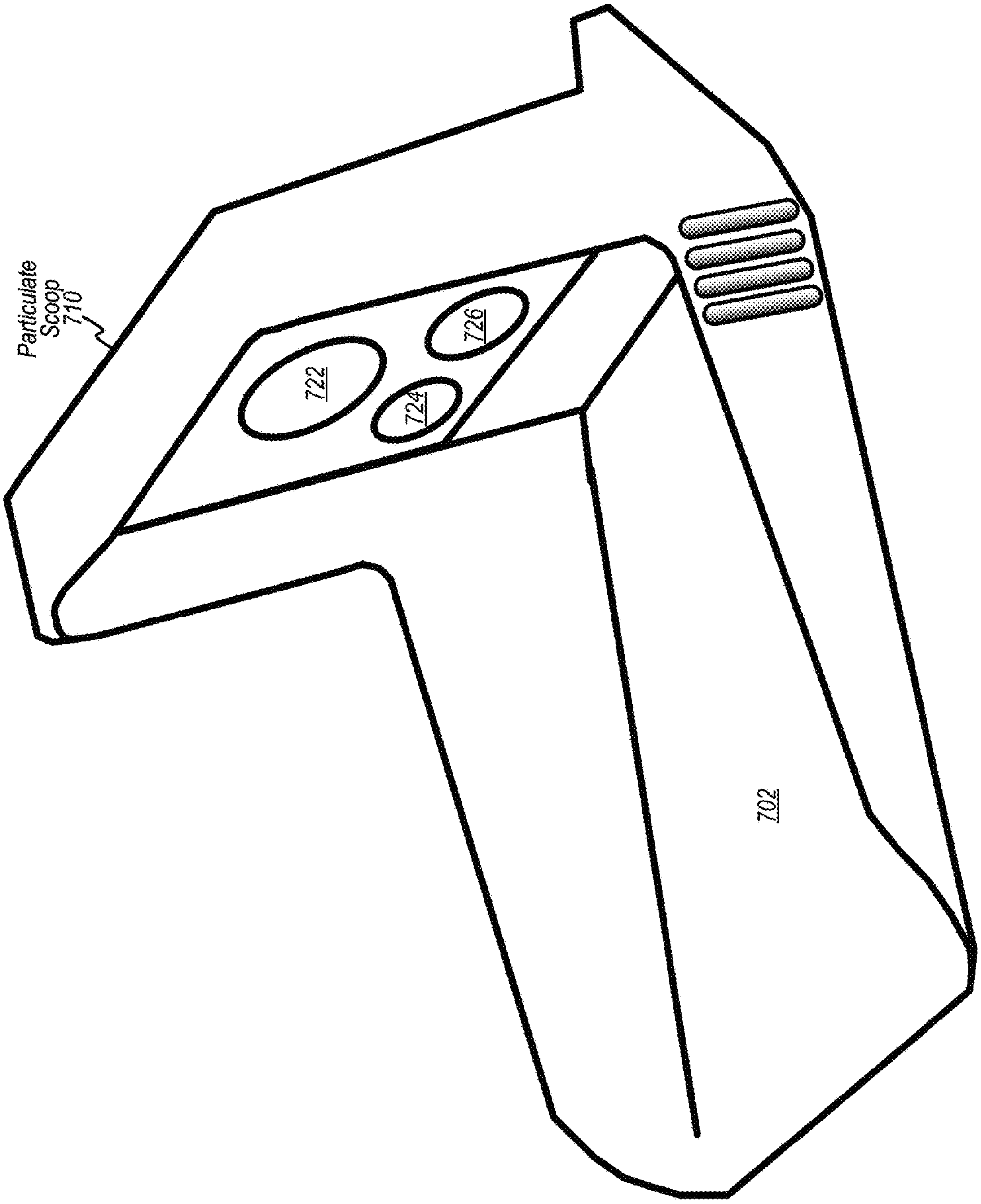
FIGS. 7 and 8 depict examples of a device to extract and analyze geologic content, such as lunar soil, according to some examples.
Figure 8:
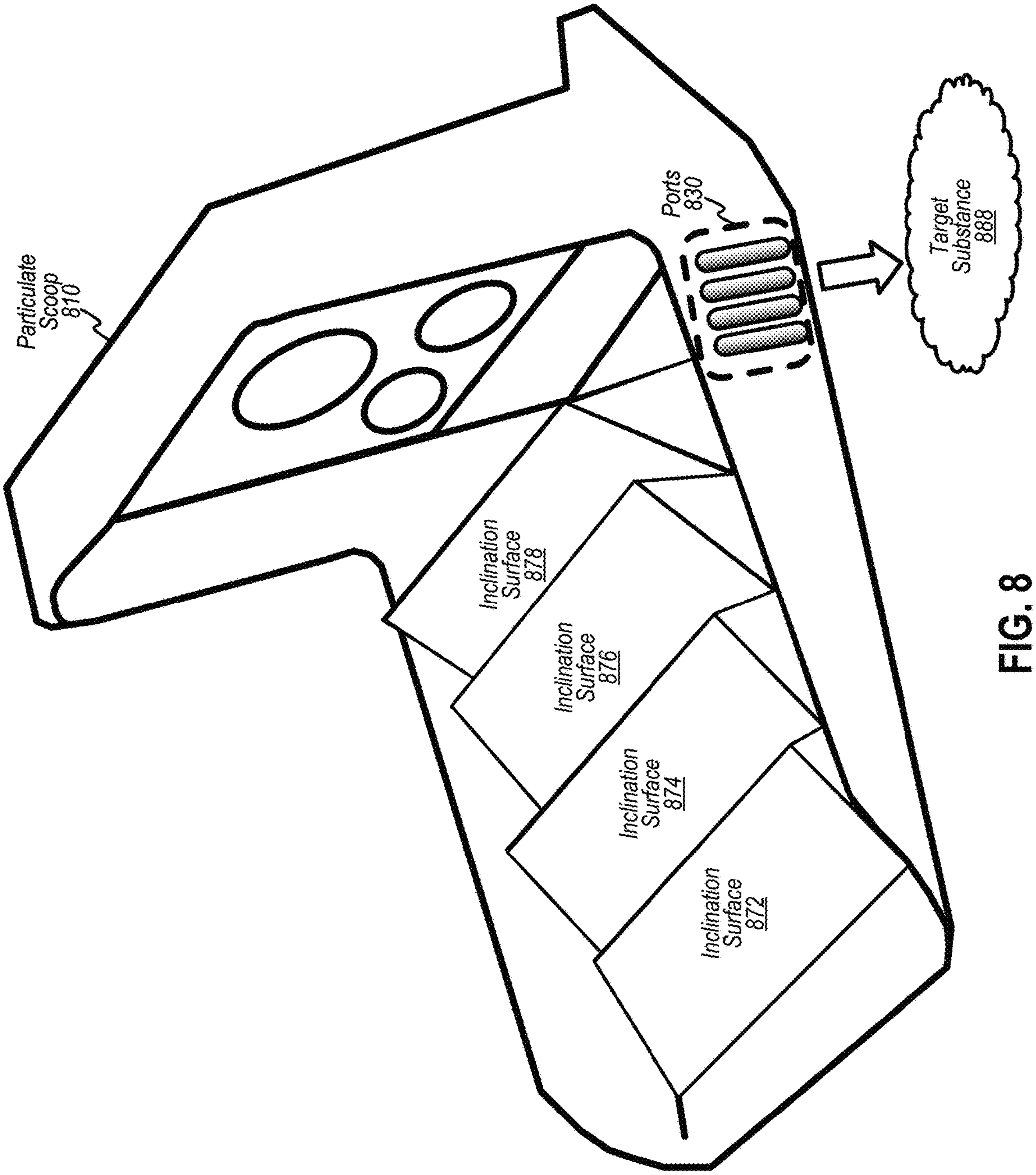

FIGS. 7 and 8 depict examples of a device to extract and analyze geologic content, such as lunar soil, according to some examples. FIG. 7 is a diagram 700 is a particulate scoop 710 including a bed 702 into which particles, such as any planetary regolith, may be captured, analyzed, and separated using one or more sensors 722, 724, and 726 (e.g., IR sensors, image sensors, spectrometry sensors, mass/weight sensors, etc.). FIG. 8 includes a diagram 800 depicting a particulate scoop 810. As shown, particulate scoop 810 may include various inclination surfaces 872, 874, 876, and 878 to filter or sift out a particular range of particle sizes or characteristics. As an example, targeted particles may be disbursed via ports 830 as target substance 888.

Figure 9:
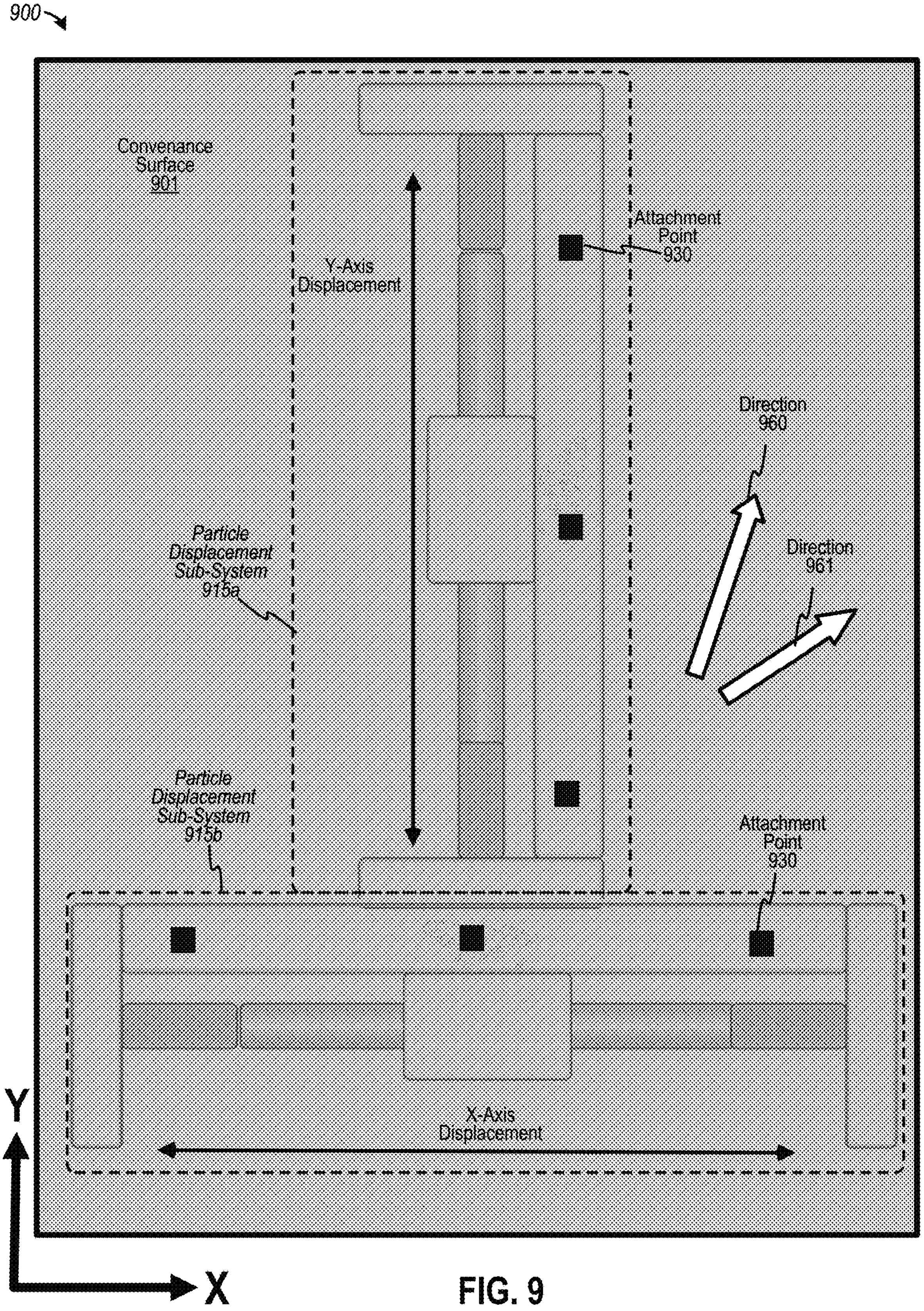
FIG. 9 includes a diagram 900 depicting an alternate implementation of particle displacement devices, as an example.

FIG. 9 includes a diagram 900 depicting an alternate implementation of particle displacement devices, as an example. Diagram 900 includes multiple particle displacement devices. As shown, a first displacement sub-system 915*a* and a second displacement sub-system 915*b* may be attached to a conveyance surface 901 at one or more attachment points 930. In this configuration, sub-systems 915*a* and 915*b* may be configured to separate and filter particles in any direction or trajectory, such as directions 960 and 961 to, for example, optimize sorting of particles.

Figure 10:
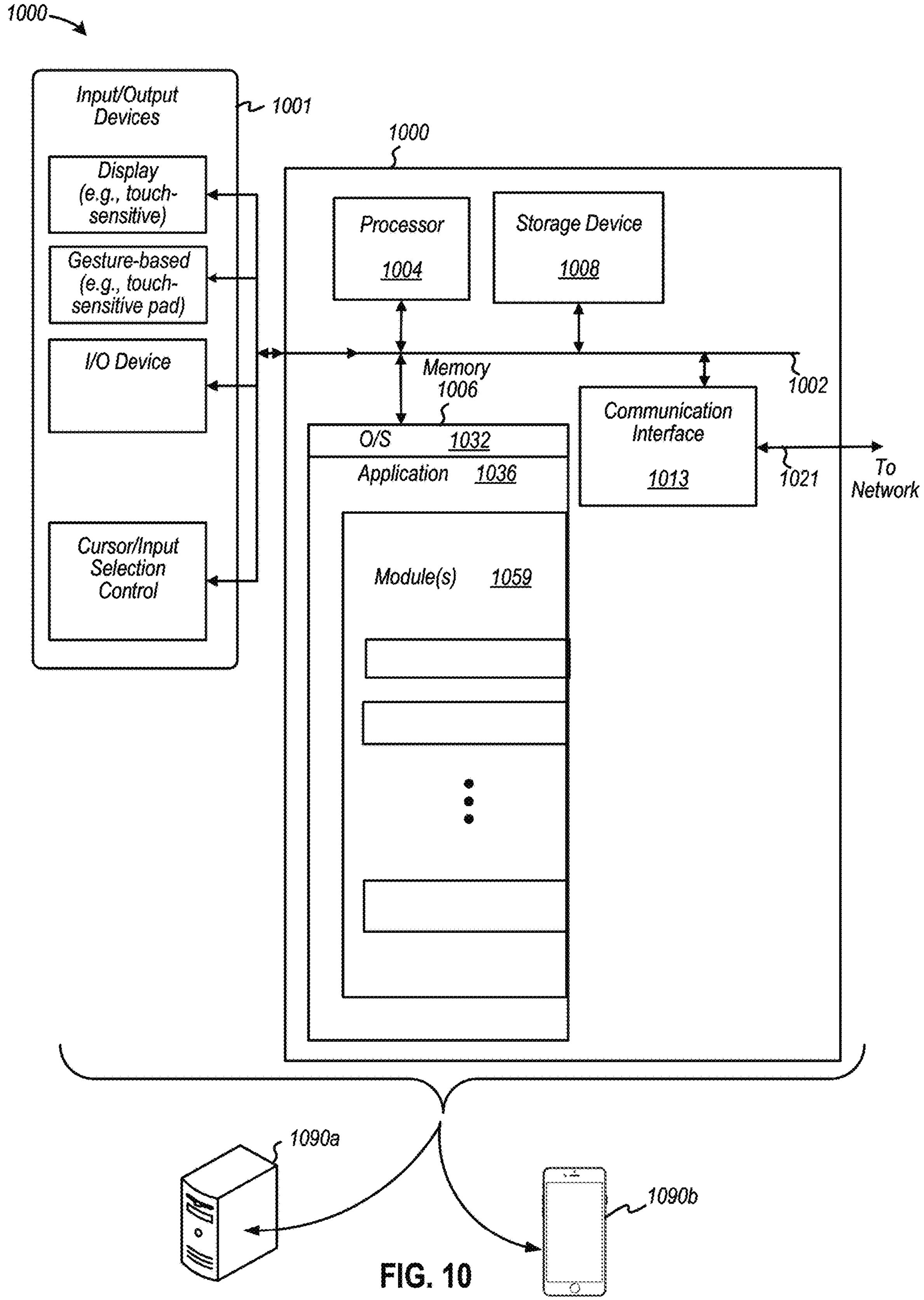
FIG. 10 depicts an example of a system architecture configured to implement automated particle separation, according to an example.

FIG. 10 illustrates examples of various computing platforms configured to provide various functionalities to components of a computing platform 1000 configured to provide functionalities described herein. Computing platform 1000 may be used to implement computer programs, applications, methods, processes, algorithms, or other software, as well as any hardware implementation thereof, to perform the above-described techniques.

In some cases, computing platform 1000 or any portion (e.g., any structural or functional portion) can be disposed in any device, such as a computing device 1090*a*, mobile computing device 1090*b*, and/or a processing circuit in association with initiating any of the functionalities described herein, via user interfaces and user interface elements, according to various examples.

Computing platform 1000 includes a bus 1002 or other communication mechanism for communicating information, which interconnects subsystems and devices, such as processor 1004, system memory 1006 (e.g., RAM, etc.), storage device 1008 (e.g., ROM, etc.), an in-memory cache (which may be implemented in RAM 1006 or other portions of computing platform 1000), a communication interface 1013 (e.g., an Ethernet or wireless controller, a Bluetooth controller, NFC logic, etc.) to facilitate communications via a port on communication link 1021 to communicate, for example, with a computing device, including mobile computing and/or communication devices with processors, including database devices (e.g., storage devices configured to store atomized datasets, including, but not limited to triplestores, etc.). Processor 1004 can be implemented as one or more graphics processing units ("GPUs"), as one or more central processing units ("CPUs"), such as those manufactured by Intel® Corporation, or as one or more virtual processors, as well as any combination of CPUs and virtual processors. Or, a processor may include a Tensor Processing Unit ("TPU"), or equivalent. Computing platform 1000 exchanges data representing inputs and outputs via input-and-output devices 1001, including, but not limited to, keyboards, mice, audio inputs (e.g., speech-to-text driven devices), user interfaces, displays, monitors, cursors, touch-sensitive displays, touch-sensitive inputs and outputs (e.g., touch pads), LCD or LED displays, and other I/O-related devices.

Note that in some examples, input-and-output devices 1001 may be implemented as, or otherwise substituted with, a user interface in a computing device associated with, for example, a user account identifier in accordance with the various examples described herein.

According to some examples, computing platform 1000 performs specific operations by processor 1004 executing one or more sequences of one or more instructions stored in system memory 1006, and computing platform 1000 can be implemented in a client-server arrangement, peer-to-peer arrangement, or as any mobile computing device, including smart phones and the like. Such instructions or data may be read into system memory 1006 from another computer readable medium, such as storage device 1008. In some examples, hard-wired circuitry may be used in place of or in combination with software instructions for implementation. Instructions may be embedded in software or firmware. The term "computer readable medium" refers to any tangible medium that participates in providing instructions to processor 1004 for execution. Such a medium may take many forms, including but not limited to, non-volatile media and volatile media. Non-volatile media includes, for example, optical or magnetic disks and the like. Volatile media includes dynamic memory, such as system memory 1006.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding, or carrying instructions for execution by the machine, and includes digital or analog communications signals or other intangible medium to facilitate communication of such instructions. Transmission media includes coaxial cables, copper wire, and fiber optics, including wires that comprise bus 1002 for transmitting a computer data signal.

In some examples, execution of the sequences of instructions may be performed by computing platform 1000. According to some examples, computing platform 1500 can be coupled by communication link 1021 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1000 may transmit and receive messages, data, and instructions, including program code (e.g., application code) through communication link 1021 and communication interface 1013. Received program code may be executed by processor 1004 as it is received, and/or stored in memory 1006 or other non-volatile storage for later execution.

In the example shown, system memory 1006 can include various modules that include executable instructions to implement functionalities described herein. System memory 1006 may include an operating system ("O/S") 1032, as well as an application 1036 and/or logic module(s) 1059. In the example shown in FIG. 10, system memory 1006 may include any number of modules 1059, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1059 of FIG. 10, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1059 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1059 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1059 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
- receiving a source material including particles of various sizes;
- identifying a subset of characteristics of the particles;
- applying a first vectored force to the source material;
- applying a second vectored force to the source material in a direction different than the first vectored force, the second vectored force greater than the first vectored force; and
- separating a first subset of particles from the source material using a scoop having one or more inclination surfaces configured to filter the first subset of particles from the source material, the first subset of particles being filtered into targeted particles based on the subset of characteristics, the targeted particles being disbursed via one or more ports on the scoop configured to receive the source material.

2. The method of claim 1 wherein separating the first subset of particles from the source material first subset of particles from the source material further comprises:

separating the particles of the various sizes into multiple subsets of the particles.

3. The method of claim 1 wherein the source material includes regolith material including agglutinates.

4. The method of claim 1 wherein separating the source material first subset of particles from the source material further comprises:

separating the particles of the various sizes into multiple subsets of the particles, including the first subset of particle and other subsets of particles, thereby forming multiple subsets of particulate.

5. The method of claim 1 wherein applying the first vectored force to the source material further comprises;

urging the particles in a direction of the first vectored force; and separating the particles of the various sizes into multiple subsets of the particles, including the first subset of particle and other subsets of particles.

6. The method of claim 1 wherein applying the second vectored force further comprises:

driving subsets of particles to a particle filter including various surfaces of inclination to separate particles to identify the subsets of particles to a particle filter.

7. The method of claim 1 wherein separating the particles of the various sizes into multiple subsets of the particles is based on particle size.

8. The method of claim 1 wherein separating the particles of the various sizes into multiple subsets of the particles is based on density of a particle.

9. A system comprising:

a memory including executable instructions; and a processor, responsive to executing the instructions, is configured to:

receive a source material including particles of various sizes;

identify a subset of characteristics of the particles;

apply a first vectored force to the source material; and apply a second vectored force to the source material in direction different than the first vectored force, the second vectored force greater than the first vectored force; and separate a first subset of particles from the source material using a scoop having one or more inclination surfaces configured to filter the first subset of particles from the source material, the first subset of particles being filtered into targeted particles based on the subset of characteristics, the targeted particles being disbursed via one or more ports on the scoop configured to receive the source material.

10. The system of claim 9 wherein the processor is configured to separate the first subset of particles from the source material and is further configured to separate the particles of the various sizes into multiple subsets of the particles.

11. The system of claim 9 wherein the source material includes regolith material including agglutinates.

12. The system of claim 9 wherein the processor is configured to:

separate the particles of the various sizes into multiple subsets of the particles, including the first subset of particle and other subsets of particles, thereby forming multiple subsets of particulate.

13. The system of claim 9 wherein the processor is configured to:

urge the particles in a direction of the first vectored force; and separate the particles of the various sizes into multiple subsets of the particles, including the first subset of particle and other subsets of particles.

14. The system of claim 9 wherein the processor is configured to:

drive subsets of particles to a particle filter including various surfaces of inclination to separate particles to identify the subsets of particles to a particle filter.

15. The system of claim 9 wherein the processor is configured to separate the particles of the various sizes into multiple subsets of the particles based on particle size.

16. The system of claim 9 wherein the processor is configured to separate the particles of the various sizes into multiple subsets of the particles based on density of a particle.

* * * * *